United States Patent [19]

Freitag et al.

[11] Patent Number: 5,109,076

[45] Date of Patent: Apr. 28, 1992

[54] POLYDIORGANOSILOXANE/POLYCARBONATE BLOCK COCONDENSATES BASED ON CERTAIN DIHYDROXYDIPHENYLCYCLOALKANES

[75] Inventors: Dieter Freitag, Krefeld; Uwe Westeppe, Mettmann; Alfred Jung, Krefeld; Peter Horlacher, Senden; Günther Weymans, Leverkusen; Ulrich Grigo, Kempen; Leo Morbitzer, Koeln; Karsten-Josef Idel, Krefeld, all of Fed. Rep. of Germany

[73] Assignee: Bayer Aktiengesellschaft, Leverkusen, Fed. Rep. of Germany

[21] Appl. No.: 450,333

[22] Filed: Dec. 13, 1989

[30] Foreign Application Priority Data

Dec. 21, 1988 [DE] Fed. Rep. of Germany ....... 3842931
Feb. 2, 1989 [DE] Fed. Rep. of Germany ....... 3903102
May 25, 1989 [DE] Fed. Rep. of Germany ....... 3917041

[51] Int. Cl.[5] .................... C08F 283/02; C08F 283/12
[52] U.S. Cl. .................... 525/464; 525/474; 528/26; 528/29
[58] Field of Search ............... 525/464, 474; 528/25, 528/29, 26

[56] References Cited

U.S. PATENT DOCUMENTS

| 3,028,365 | 4/1962 | Schnell | 528/198 |
| 3,189,662 | 6/1965 | Vaughn, Jr. | 260/824 |
| 3,419,634 | 12/1968 | Vaughn, Jr. | 260/824 |
| 4,569,970 | 2/1986 | Paul et al. | 525/67 |
| 4,584,360 | 4/1986 | Paul et al. | 528/14 |
| 4,732,949 | 3/1988 | Paul et al. | 525/464 |
| 4,982,014 | 1/1991 | Freitag | 568/721 |

Primary Examiner—Melvyn I. Marquis
Assistant Examiner—R. Dean, Jr.
Attorney, Agent, or Firm—Joseph C. Gil; Richard E. L. Henderson

[57] ABSTRACT

Thermoplastic polydiorganosiloxane/polycarbonate block copolymers based on dihydroxydiphenylcycloalkanes corresponding to the following general formula (I):

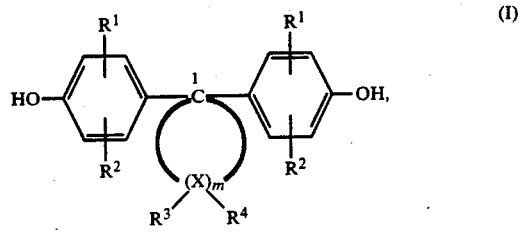

wherein
$R^1$ and $R^2$ independently represent hydrogen, halogen, preferably chlorine or bromine, $C_1$-$C_8$ alkyl, $C_5$ or $C_6$ cycloalkyl, $C_5$-$C_{10}$ aryl or $C_7$-$C_{12}$ aralkyl, preferably phenyl-$C_1$-$C_4$-alkyl, in particular benzyl: m represents an integer of from 4 to 7, preferably 4 or 5;
$R^3$ and $R^4$ may be chosen individually for each X and independently represent hydrogen or $C_1$-$C_{12}$ alkyl; and
X represents carbon; with the proviso that $R^3$ and $R^4$ both represent alkyl on at least one atom X, having an average molecular weight $\overline{M}_w$ (weight average) of 10 000 to 300 000, a content of aromatic polycarbonate of 21 to 99.5% by weight and a content of polyorganosiloxane of 79 to 0.5% by weight.

8 Claims, No Drawings

POLYDIORGANOSILOXANE/POLYCARBONATE BLOCK COCONDENSATES BASED ON CERTAIN DIHYDROXYDIPHENYLCYCLOALKANES

The invention relates to thermoplastic polydiorganosiloxane/polycarbonate block copolymers based on dihydroxydiphenylcycloalkanes corresponding to the following general formula (I):

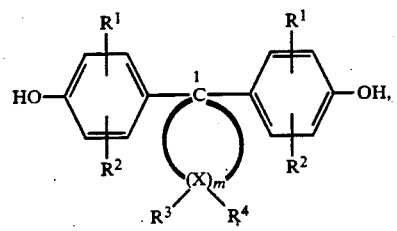

wherein $R^1$ and $R^2$ independently represent hydrogen, halogen, preferably chlorine or bromine, $C_1-C_8$ alkyl, $C_5$ or $C_6$ cycloalkyl, $C_5-C_{10}$ aryl or $C_7-C_{12}$ aralkyl, preferably phenyl-$C_1-C_4$-alkyl, in particular benzyl;

m represents an integer of from 4 to 7, preferably 4 or 5;

$R^3$ and $R^4$ may be chosen individually for each X and independently represent hydrogen or $C_1-C_{12}$ alkyl; and X represents carbon;

with the proviso that $R^3$ and $R^4$ both represent alkyl on at least one atom X.

Preferably, $R^3$ and $R^4$ in formula I both represent alkyl on 1 or 2 atoms X only, in particular on only one atom X. Methyl is the preferred alkyl radical; the X atoms in the α-position relative to the diphenyl-substituted C atom (C-1) are preferably not substituted by alkyl, but in contrast alkyl-disubstitution in the β-position relative to C-1 is preferred. Most preferable one X-atom in the β-position is dialkyl substituted and one X-atom in the β'-position is monoalkyl substituted.

Particularly preferred dihydroxyphenylcycloalkanes (I) are those with 5 and 6 ring carbon atoms in the cycloaliphatic radical (m=4 or 5 in formula I), for example diphenols of the formulae:

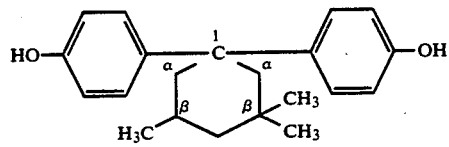

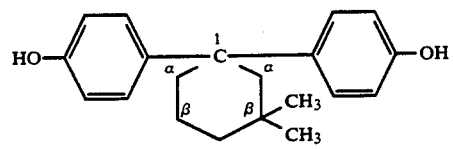

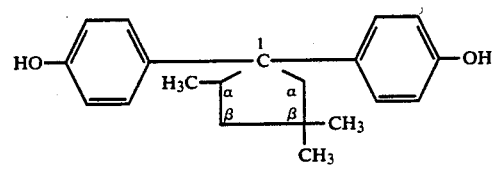

and

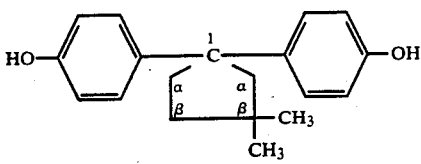

The polydiorganosiloxane/polycarbonate block copolymers according to the present invention are distinguished by a high heat distortion point, strength, good UV stability and low temperature toughness.

Polydiorganosiloxane/polycarbonate block copolymers are known in principle (c.f. U.S. Pat. Nos. 3,189,662 and 3,419,634, DE-OS 3,334,782 and 3,506,472 and EP-A 122 535 and 135 794).

The thermoplastic polydiorganosiloxane/polycarbonate block copolymers according to the present invention have an average molecular weight $\overline{M}_w$ (weight average) of from 10,000 to 300,000, preferably from 15,000 to 80,000 (determined in a known manner by ultracentrifugation or scattered light measurement), a content of aromatic carbonate of from 21 to 99.5 wt. % and a content of polydiorganosiloxane of from 79 to 0.5 wt. %; they may be prepared from:

a) α,ω-bis-hydroxyaryloxy-polydiorganosiloxanes having a degree of polymerization Pn of from 5 to 200, preferably from 20 to 160, preferably those corresponding to general formula (II);

b) diphenols of formula (I) and, optionally (III), where from 1 to 100 mol %, preferably from 10 to 80 mol %; of the total diphenols are those of formula I and, optionally, c) chain terminators; and, optionally, d) branching agents, by phase interface polycondensation with a "carbonate donor".

In a preferred embodiment the thermoplastic polyorganosiloxane/polycarbonate block copolymers according to the invention are composed of 75-99.5% by weight of aromatic polycarbonate and 25 to 0.5% by weight of polysiloxane.

In another preferred embodiment the composition is 21 to 75% by weight, preferably 30 to 70% by weight of aromatic polycarbonate and 79 to 25% by weight, preferably 70 to 30% by weight of polysiloxanes.

The diphenols on which the polycarbonate is based can correspond to the formula I to an extent of 100%, or mixtures with diphenols of the formula III can be used, in which the content of diphenols of the formula I is 100 to 1% by weight, preferably 100-30% by weight, and, in particular, where the polycarbonate contents are high, 80-10% by weight.

Suitable α,ω-bis-hydroxyaryloxy-polydiorganosiloxanes (a) are known, e.g. from U.S. Pat. No. 3,419,634.

Preferred α,ω-bis-hydroxyaryloxy-polydiorganosiloxanes are those corresponding to general formula (II):

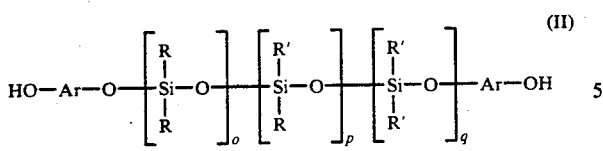

wherein
- Ar represents the radical of a diphenol (I) or (III) without the two hydroxyl groups; and
- R and R' represent linear and branched alkyl, alkenyl, halogenated linear and branched alkyl, aryl or halogenated aryl, preferably methyl; and
- the number of diorganosiloxy units $n = o+p+q = 5$ to 200, preferably from 20 to 160.

In formula (II), the radicals R and the radicals R' are independent of one another. They are preferably $C_1$-$C_{20}$ alkyl, $C_2$-$C_5$ alkenyl or $C_5$-$C_{14}$ aryl. Halogenated in the present context means partially or completely chlorinated, brominated or fluorinated. Particularly preferably, R and R' are methyl, ethyl, propyl, n-butyl, t-butyl, vinyl, phenyl, naphthyl, chloromethyl, trifluoropropyl, perfluorobutyl or perfluorooctyl.

In the diphenols of formula (III):

$Ar^o$ are the same or different arylene radicals preferably having from 6 to 30 carbon atoms. Examples of diphenols (III) are:

hydroquinone
resorcinol
dihydroxydiphenyls
bis-(hydroxyphenyl)-alkanes
bis-(hydroxyphenyl)-cycloalkanes (except those of formula I)
bis-(hydroxyphenyl) sulphides
bis-(hydroxyphenyl) ethers
bis-(hydroxyphenyl) sulphoxides
bis-(hydroxyphenyl) sulphones and
α,ω-bis-(hydroxyphenyl)-diisopropylbenzenes and nuclear-alkylated and nuclear-halogenated derivatives thereof. These and other suitable aromatic dihydroxy compounds are described e.g. in U.S. Pat. Nos. 3,028,365 and 2,999,846, in DE-OS 1,570,703; 2,036,052; 2,063,050 and 2,211,957, in French Patent Specification 1,561,518 and in the monograph "H. Schnell, Chemistry and Physics of Polycarbonates, Interscience Publishers, New York, 1964".

Preferred diphenols (III) are:

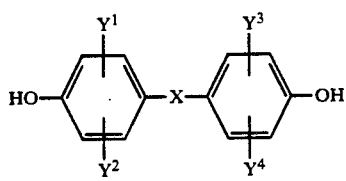

wherein
X represents a single bond, —CH$_2$—, —C(CH$_3$)$_2$—, O, S, SO$_2$,

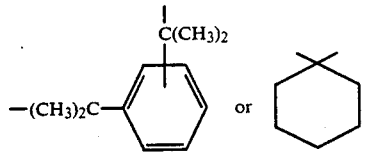

and
$Y^1$ to $Y^4$, which may be the same of different, represent hydrogen, $C_1$-$C_4$ alkyl, preferably methyl, or halogen, preferably chlorine or bromine.

Examples of these are:

2,2-bis-(4-hydroxyphenyl)-propane
1,1-bis-(4-hydroxyphenyl)-cyclohexane
2,2-bis-(3,5-dichloro-4-hydroxyphenyl)-propane
2,2-bis-(3,5-dibromo-4-hydroxyphenyl)-propane
2,2-bis-(3,5-dimethyl-4-hydroxyphenyl)-propane
bis-(3,5-dimethyl-4-hydroxyphenyl)-methane and
bis-(4-hydroxyphenyl) sulphide.

It is possible for one or more diphenols (I) and optionally also one or more diphenols (III) to be employed.

Diphenols (I) may be prepared in a known manner by condensation of phenols (V):

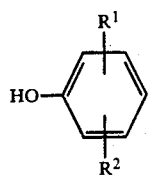

and ketones (VI):

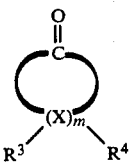

wherein in these general formulae (V) and (VI), X, $R^1$, $R^2$, $R^3$, $R^4$ and m are as defined in connection with (I). They are described in German Patent Application P 3 832 396.0. (U.S. Pat. No. 4,982,014).

Chain terminators (c) which may be employed are aromatic compounds having a functional group, such as aromatic acid halides or phenols, in particular the customary phenols, such as p-t-butylphenol, p-chlorophenol, 2,4,6-tribromophenol and phenol, in the customary amounts, which are determined according to the desired molecular weight of the block copolymers. Phenols (IV):

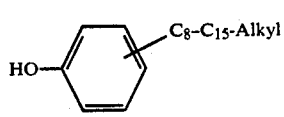

are particularly preferred as chain terminators.

In general, from 0.5 to 10.0 mol %, based on the diphenols used, are employed.

Branching agents (d) which may be employed are those having three or more functional groups, in particular those having three or more phenolic hydroxyl groups, it being appropriate to observe the conventional amounts of branching agent of from 0.05 to 2 mol-%, based on the diphenols incorporated.

Examples of some of the compounds which may be used and which have three or more phenolic hydroxyl groups are: 2,4-bis-(4-hydroxyphenyl-isopropyl)-phenol, 2,6-bis-(2'-hydroxy-5'-methylbenzyl)-4-methyl-phenol, 2-(4-hydroxyphenyl)-2-(2,4-dihydroxyphenyl)-propane and 1,4-bis-(4,4'-dihydroxytriphenylmethyl)-benzene. Some of the other suitable trifunctional compounds are 2,4-dihydroxybenzoic acid, trimesic acid, cyanuric chloride and 3,3-bis-(4-hydroxyphenyl)-2-oxo-2,3-dihydroindole, and also 3,3-bis-(4-hydroxy-3-methyl-phenyl)-2-oxo-2,3-dihydroindole.

Suitable organic solvents for the two phase interface polycondensation are known for the preparation of aromatic polycarbonates; examples include methylene chloride and chlorobenzene.

The amounts of organic solvent (=organic phase) are preferably chosen so that the phase interface polycondensation proceeds in from 5 to 20 wt. % solutions in the organic solvent, preferably from 10 to 15 wt. % solutions.

Suitable basic compounds for formation of the aqueous alkaline phase are e.g. LiOH, NaOH, KOH, Ca(OH)$_2$ and Ba(OH)$_2$.

The volumes of aqueous-alkaline phase and total organic phase are preferably the same in the two phase boundary polycondensation.

The pH of the aqueous phase during the reaction is generally pH 9 to 14, preferably from pH 12 to 13.

Suitable catalysts for the polycondensation by the two phase boundary process are the tertiary aliphatic amine catalysts known for polycarbonate synthesis, such as trimethylamine, triethylamine, tri-n-propylamine, tri-n-butylamine or N-ethylpiperidine; if appropriate, the known quaternary ammonium salts, such as tetrabutylammonium bromide, may also be employed.

Generally the amount of catalyst for the phase interface polycondensation process varies, according to the diphenol employed, from 0.2 to 5 mol-%, and from 5 to 10 mol-% if tetramethyl-substituted diphenols are used, in each case based on the total amount of diphenols (b).

The amounts of diphenol (b) and $\alpha,\omega$-bis-hydroxyaryloxypolydiorganosiloxane (a) depend on the desired content of poly(diorganosiloxane) units in the block copolymer. The conversion of the reactants is usually quantitative.

In the phase interface polycondensation, the $\alpha,\omega$-bis-hydroxyaryloxy-polydiorganosiloxanes and the chain terminators may be added together with the diphenols (b) before introduction of the phosgene, or separately during or after the introduction of the phosgene, but in each case before addition of the polycondensation catalyst.

Carbonyl halides, in particular carbonyl chlorides, such as phosgene and COBr$_2$, or the bischlorocarbonic acid esters of diphenols are used in a corresponding amount as "carbonate donors" for the phase interface polycondensation, less than ½ mol diphenol in each case being used per mol of halogeno-carbonic acid group.

The aromatic thermoplastic block copolymers may be separated off from the reaction mixtures in the same way as aromatic polycarbonates. In this procedure, the organic phase containing the dissolved copolycarbonate is first separated off and washed, and the copolycarbonate is then isolated by evaporating the solution, an extruder preferably being used as the final stage of the working-up process.

The thermoplastic block copolymers according to the present invention may contain anti-ageing agents which considerably increase the stability of the products. For modification of the products according to the present invention, it is possible to add, e.g. carbon black, kieselguhr, kaolin, clays, CaF$_2$, CaCO$_3$, aluminium oxides, glass fibres and inorganic pigments, both as fillers and as nucleating agents. The products may also contain the mould release agents customary for polycarbonate, such as e.g. glycerol stearate.

The polydiorganosiloxane/polycarbonate block copolymers according to the present invention are thermoplastic moulding compositions which may be used in all instances where their essential properties, such as high heat distortion point, strength, toughness and UV stability, are required.

They may be used for the production of all types of shaped articles by known processes. In particular, shaped articles may be produced by extrusion or injection moulding.

Examples of shaped articles which may be produced are vehicle body components and housing components, e.g. for electrical appliances and apparatus, such as domestic appliances, building sheets, films and membranes.

The notched impact strength was determined in accordance with ISO R 180 on flat bars (80 mm × 10 mm × 4 mm); the heat distortion point was determined in accordance with the Vicat (B) method according to DIN 53 460/ISO 306.

The storage modulus values of Examples 8 and 9 are taken from shear modulus curves which are obtained with a Rheometrics Dynamic Analyser. The device operates with a forced torsinal oscillation of a frequency of 1 Hz.

The Shore A and Shore D hardnesses are determined according to DIN 53505/150868.

EXAMPLES

EXAMPLE 1: Preparation of the Bisphenol (I)

7.5 mol (705 g) phenol and 0.15 mol (30.3 g) dodecyl-thiol are initially introduced into a 1 liter round-bottomed flask with a stirrer, dropping funnel, thermometer, reflux condenser and gas inlet tube and are saturated with dry HCl gas at from 28° to 30° C. A solution of 1.5 mol (210 g) dihydroisophorone (3,3,5-trimethylcyclohexan-1-one) and 1.5 mol (151 g) phenol are added dropwise to this solution over the course of 3 hours, passage of HCl gas through the reaction solution being continued. When the addition has ended, HCl gas is introduced for a further 5 hours. The mixture is left at room temperature for 8 hours to complete reaction. The excess phenol is then removed by steam distillation. The residue which remains is extracted twice with hot petroleum ether (60–90) and once with methylene chloride and the product is filtered off.

Yield: 370 g.

Melting point: 205°–207° C.

EXAMPLE 2

14.73 g (0.048 mol) bisphenol (I), 97.11 g (0.425 mol) bisphenol A, 33.7 g, (0.84 ml) NaOH and 1,916.25 g water are dissolved under an inert gas atmosphere, while stirring. A solution of 6.82 g of the polydimethylsiloxane block (Pn=73) with bisphenol A end groups (=5 wt. % SiMe$_2$O) and 1.152 g (12.25 mmol) phenol in 1,250 g methylene chloride is then added. 79.5 g (0.80 mol) phosgene are passed into the well-stirred solution at pH 12–13 and at from 21° to 25° C. 0.68 ml ethylpiperidine is then added and the mixture is stirred for a further 45 min. The bisphenolate-free aqueous phase is removed and the organic phase is acidified with phosphoric acid, washed neutral with water and freed from solvent.

EXAMPLE 3

29.45 g (0.095 mol) bisphenol (I), 5,3 g (0.33 mol) bisphenol A, 33.7 g (0.84 mol) NaOH and 1,916.25 g water are dissolved under an inert gas atmosphere, while stirring. A solution of 6.8 g of the polydimethylsiloxane block (Pn=73) with bisphenol A end groups (=5 wt. % SiMe$_2$O) and 1.035 g (11.0 mmol) phenyl in 1,250 g methylene chloride is then added. 79.5 g (0.80 mol) phosgene are passed into the well-stirred solution at pH 12–13 and at from 21° to 25° C. 0.68 ml ethylpiperidine is then added and the mixture is stirred for a further 45 min. The bisphenolate-free aqueous phase is removed and the organic phase is acidified with phosphoric acid, washed neutral with water and freed from solvent.

EXAMPLE 4 (Comparison)

43.13 g (0.19 mol) bisphenol A, 13.5 g (0.34 mol) NaOH and 766.5 g water are dissolved under an inert gas atmosphere, while stirring. A solution of 2.73 g of the polydimethylsiloxane block (Pn=73) with bisphenol A end groups (=5 wt. % SiMe$_2$O) and 0.34 g (3.6 mmol) phenol in 500 g methylene chloride is then added. 31.7 g (0.32 mol) phosgene are then passed in the well-stirred solution at pH 12–13 and at from 21° to 25° C. 0.27 ml ethylpiperidine is then added and the mixture is stirred for a further 45 min. The bisphenolate-free aqueous phase is removed and the organic phase is acidified with phosphoric acid, washed neutral with water and freed from solvent.

EXAMPLE 5 (Comparison)

6.2 g (0.02 mol) bisphenol (I), 18.24 g (0.08 mol) bisphenol A, 24,0 g (0.6 mol) NaOH and 270 g water are dissolved under an inert gas atmosphere, while stirring, and 0.3384 g (36 mmol) phenol in 250 g methylene chloride are added. 19.8 g (0.20 mol) phosgene are passed into the well-stirred solution at pH 12–13 and at from 21° to 25° C. 0.1 ml ethylpiperidine is then added and the misture is stirred for another 45 minutes. The bisphenolate-free aqueous phase is removed and the organic phase is acidified with phosphoric acid, washed neutral with water and freed from solvent.

TABLE I

| | Tabular comparison of properties | | | |
|---|---|---|---|---|
| Properties | Example 2 | Example 3 | Example 4 (comparison) | Example 5 (comparison) |
| Rel. viscosity | 1.306 | 1.296 | 1.298 | 1.301 |
| Siloxane block length | 73 | 73 | 73 | 0 |
| Notched impact strength according to Izod (4 mm) | | | | |
| +20° C. (kJ/m$^2$) | 48.8* | 33.8* | 96* | 10 |
| −20° C. (kJ/m$^2$) | 31.1* | 17.6 | — | — |
| −40° C. (kJ/m$^2$) | 22.2 | 14.5 | — | — |
| Heat distortion point Vicat (VST/B/120) (°C.) | 157 | 162 | 148 | 173 |

*Tough fracture

EXAMPLE 6

62.99 g (0.23 mol) of bisphenol (I) (Example 1), 24 g (0.105 mol) of bisphenol A, 54 g (1.35 mol) of NaOH and 3070 g of water are dissolved with stirring under an inert gas atmosphere. Then a solution of 109.6 g of the polydimethylsiloxane block (Pn=32) containing bisphenol A end-groups (=45% by weight of SiMe$_2$O) in 1500 ml of methylene chloride is added. 126.8 g (1.28 mol) of phosgene are passed into the well-stirred solution at 21° to 25° C. and a pH of 12 to 13. Then 1.12 ml of ethyl piperidine is added and the mixture is stirred for a further 45 mins. The bisphenolate-free aqueous phase is separated off and the organic phase is acidified with phosphoric acid, washed neutral with water and freed from solvent.

Shore A hardness: 86.
Shore D hardness: 42.

EXAMPLE 7

32.98 g (0.106 mol) of bisphenol (I) (Example 1), 15.6 g (0.39 mol) of NaOH and 519.1 g of water are dissolved with stirring under an inert gas atmosphere. Then a solution of 17.45 g of the polydimethylsiloxane block (Ph=78) containing bisphenol (I,1) end groups (=40% by weight of SiMe$_0$) and 0.271 g (2.88 mmol) of phenol in 375 ml of methylene chloride is added. 25.33 g (0.256 mol) of phosgene are passed into the well-stirred solution at 21° to 25° C. and a pH of 12 to 13. Then 0.22 ml of ethyl piperidine is added and the mixture is stirred for a further 45 mins. The bisphenolate-free aqueous phase is separated off and the organic phase is acidified with phosphoric acid, washed neutral with water and freed from solvent.

Tg (DSC): 226.2° C.

EXAMPLE 8

12.46 g (0.04 mol) of bisphenol (I) (Example 1), 13.5 g (0.34 mol) of NaOH and 766.5 g of water are dissolved with stirring under an inert gas atmosphere. Then a solution of 41.12 g of the polydimethylsiloxane block (Ph=10) containing bisphenol A end groups (=45% by weight of SiMe$_2$O) and 0.207 g (2.2 mmol) of phenol in 375 ml of methylene chloride is added. 31.7 g (0.32 mol) of phosgene are passed into the well-stirred solution at 21° to 25° C. and a pH of 12 to 13. Then 0.27 ml of ethyl piperidine are added and the mixture is stirred for a further 45 mins. The bisphenolate-free aqueous phase is separated off and the organic phase is acidified with phosphoric acid, washed neutral with water and freed from solvent.

| Temperature (°C.) | Storage modulus G' (mPa) |
| --- | --- |
| 0 | 130 |
| 40 | 88 |
| 100 | 32 |

Shore D hardness: 45.

EXAMPLE 9 (Comparison)

11.04 g (0.0484 mol) of bisphenol A, 13.5 g (0.34 mol) of NaOH and 766.5 g of water are dissolved with stirring under an inert gas atmosphere. Then a solution of 36.86 g of the polydimethylsiloxane block (Pn=10) containing bisphenol A end groups (=45% by weight of SiMe$_2$O) and 0.377 g (4.02 mmol) of phenol in 375 ml of methylene chloride is added.

31.8 g (0.32 mol) of phosgene are passed into the well-stirred solution at 21° to 25° C. and a pH of 12 to 13. Then 0.28 ml of ethyl piperidine is added and the mixture is stirred for a further 45 mins. The bis-phenolate-free aqueous phase is separated off and the organic phase is acidified with phosphoric acid, washed neutral with water and freed from solvent.

| Temperature (°C.) | Storage modulus G' (mPa) |
| --- | --- |
| 0 | 3.8 |
| 40 | 1.3 |
| 100 | — |

Shore A hardness: 50.

We claim:

1. A polydiorganosiloxane/polycarbonate block copolymer having an average molecular weight M$_w$ (weight-average) of from 10,000 to 300,000 comprising
    (a) 21 to 99.5 wt. % aromatic polycarbonate blocks based on diphenols comprising
        (i) 1 to 100 mol %, based on the total diphenol content, of a dihydroxydiphenylcycloalkane corresponding to the formula

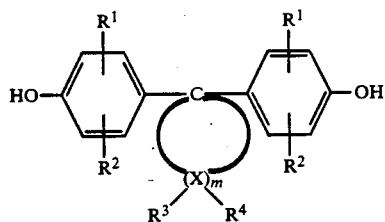

wherein
    R$^1$ and R$^2$ independently represent hydrogen, halogen, C$_1$-C$_8$ alkyl, C$_5$ or C$_6$ cycloalkyl, C$_6$-C$_{10}$ aryl, or C$_7$-C$_{12}$ aralkyl;
    m represents an integer of from 4 to 7;
    R$^3$ and R$^4$ are chosen individually for each X and independently represent hydrogen or C$_1$-C$_{12}$ alkyl; and
    X represents a carbon atom;
    with the proviso that R$^3$ and R$^4$ both represent alkyl on at least one carbon atom X; and
        (ii) optionally, up to 99 mol %, based on the total diphenol content, of a diphenol corresponding to the formula HO—Ar$^o$—OH wherein Ar$^o$ represents an arylene radical or a nuclear-alkylated or nuclear-halogenated derivative thereof; and
    (b) 79 to 0.5 wt. % polydiorganosiloxane blocks.

2. A polydiorganosiloxane/polycarbonate block copolymer according to claim 1 wherein C$_7$-C$_{12}$ aralkyl is phenyl-C$_1$-C$_4$-alkyl.

3. A polydiorganosiloxane/polycarbonate block copolymer according to claim 1 wherein C$_7$-C$_{12}$ aralkyl is benzyl.

4. A polydiorganosiloxane/polycarbonate block copolymer according to claim 1 wherein m is 4 or 5.

5. A polydiorganosiloxane/polycarbonate block copolymer according to claim 1 wherein the polydiorganosiloxane blocks are based on an α,ω-bis-hydroxyaryloxypolysiloxane having a degree of polymerization of from 5 to 200.

6. A polydiorganosiloxane/polycarbonate block copolymer according to claim 1 wherein the polydiorganosiloxane block is derived from an α,ω-bis-hydroxyaryloxypolysiloxane corresponding to the formula

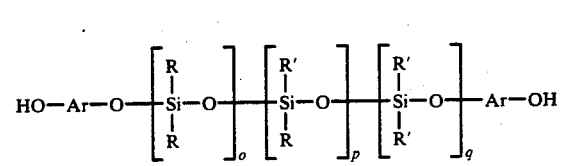

wherein
Ar represents the radical, without the two hydroxyl groups, of
    (i) a dihydroxydiphenylcycloalkane having the formula

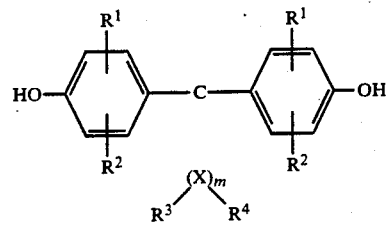

wherein R$^1$, R$^2$, R$^3$, R$^4$, X, and m are defined as in claim 4, or
    (ii) a diphenol having the formula HO—Ar$^o$—OH wherein Ar$^o$ is defined as in claim 1;
R and R' represent linear alkyl, branched alkyl, alkenyl, halogenated linear alkyl, halogenated branched alkyl, aryl, or halogenated aryl; and
the sum (o+p+q), representing the number of diorganosiloxy units, is from 5 to 200.

7. A polydiorganosiloxane/polycarbonate block copolymer according to claim 6 wherein R and R' represent methyl.

8. A polydiorganosiloxane/polycarbonate block copolymer according to claim 6 wherein the sum (o+p+q) is from 20 to 160.

* * * * *